(12) United States Patent
Goto

(10) Patent No.: US 10,365,850 B2
(45) Date of Patent: Jul. 30, 2019

(54) METHOD OF STORING DATA, INFORMATION PROCESSING APPARATUS AND NON-TRANSITORY COMPUTER-READABLE STORAGE MEDIUM

(71) Applicant: FUJITSU LIMITED, Kawasaki-shi, Kanagawa (JP)

(72) Inventor: Keisuke Goto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 46 days.

(21) Appl. No.: 15/878,583

(22) Filed: Jan. 24, 2018

(65) Prior Publication Data

US 2018/0232145 A1 Aug. 16, 2018

(30) Foreign Application Priority Data

Feb. 14, 2017 (JP) ................................. 2017-025401

(51) Int. Cl.
*G06F 12/00* (2006.01)
*G06F 3/06* (2006.01)

(52) U.S. Cl.
CPC ............ *G06F 3/0644* (2013.01); *G06F 3/061* (2013.01); *G06F 3/064* (2013.01); *G06F 3/0659* (2013.01); *G06F 3/0673* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 2014/0229696 A1* | 8/2014 | Feng | ........................ | G06F 3/064 711/162 |
| 2014/0280356 A1* | 9/2014 | Danilak | .............. | G06F 16/2272 707/796 |
| 2017/0220292 A1* | 8/2017 | Hashimoto | ........... | G06F 3/0679 |

FOREIGN PATENT DOCUMENTS

JP 11-167508 6/1999

OTHER PUBLICATIONS

Bing-Chao Huang et al, "Fast Stable Merging and Sorting in Constant Extra Space", The Computer Journal, Oxford University Press, vol. 35, No. 6, pp. 643-650, Dec. 1, 1992 (8 pages).

* cited by examiner

*Primary Examiner* — Daniel D Tsui
(74) *Attorney, Agent, or Firm* — Fujitsu Patent Center

(57) ABSTRACT

A method of storing target data including a plurality of types of data includes acquiring first information indicating a number of data piece of each of the plurality of types of data, and second information indicating an priority order of the plurality of types of data, storing, in a management area, third information indicating an area defined on the first and the second information within the data storage area, specifying a storage position of first data included in the target data, storing the first data in the specified storage position when second data is not stored in the specified storage position, and storing the first data in a position in the management area in which the third information corresponding to the type of the first data is stored or in the specified storage position, based on the priority order, when the second data is stored in the specified storage position.

18 Claims, 30 Drawing Sheets

DATA STORAGE AREA

| 1 | 2 | 3 | 4 | 5 | 6 | a | b | c |
|---|---|---|---|---|---|---|---|---|
| a1 | a2 | b1 | b2 | b3 | c1 | a3 | b4 | c2 |

FIG. 14A

| DATA STORAGE AREA | 1 | 2 | 3 | 4 | 5 | 6 | 7 | 8 | 9 |
|---|---|---|---|---|---|---|---|---|---|
| | a1 | a2 | a3 | b1 | b2 | b3 | b4 | c1 | c2 | kn
a:3
b:4
c:2

FIG. 14B

| DATA STORAGE AREA | 1 | 2 | 3 | 4 | 5 | 6 | 7 | 8 | 9 |
|---|---|---|---|---|---|---|---|---|---|
| | a1 | a2 | a3 | | | | | | |
| | | | b1 | b2 | b3 | b4 | | | |
| | | | | | c1 | c2 | | | | kn−1
a:2
b:3
c:1

FIG. 25A

| DATA STORAGE AREA | 1 | 2 | 3 | 4 | 5 | 6 | a | b | c |
|---|---|---|---|---|---|---|---|---|---|
| | a1 | a2 | b1 | b2 | b3 | c1 | a3 | b4 | c2 |

FIG. 25B

| DATA STORAGE AREA | 1 | 2 | 3 | 4 | 5 | 6 | 7 | 8 | 9 |
|---|---|---|---|---|---|---|---|---|---|
| | a1 | a2 | a3 | b1 | b2 | b3 | b4 | c1 | c2 |

METHOD OF STORING DATA, INFORMATION PROCESSING APPARATUS AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-25401, filed on Feb. 14, 2017, the entire contents of which are incorporated herein by reference.

FIELD

The embodiments discussed herein are related to a method of storing data, an information processing apparatus and a non-transitory computer-readable storage medium.

BACKGROUND

In a case where plural types of data is sorted for each type and stored, a storage area (hereinafter, referred to as management area) storing information, which is referred to during the sorting, may be used separately from an area storing the data itself.

However, in a case where a large amount of data is processed, by preparing not only an area for storing the data itself but also a management area, the storage area of a system is occupied, which may affect the performance of other processes. In addition, in a case of a system (for example, embedded system) in which usable physical resources are limited, a process may not be performed due to an insufficient storage area. As related art of Patent Document 1, there is Japanese Laid-open Patent Publication No. 11-167508. Also, as related art of non-Patent Document 1, there is Bing-Chao Huang, Michael A. Langston, "Fast Stable Merging and Sorting in Constant Extra Space", The Computer Journal, Oxford University Press, Dec. 1, 1992, volume 35, No. 6, pp. 643-650.

SUMMARY

According to an aspect of the invention, a method of storing target data into a data storage area by a computer, the target data including a plurality of types of data, the method includes acquiring first information indicating a number of data piece of each of the plurality of types of data included in the target data, and second information indicating an priority order of the plurality of types of data in the target data, storing, in a management area within the data storage area, third information indicating an area defined based on the first information and the second information within the data storage area, each data piece of the plurality of types of data being to be stored in the area indicated by the third information, specifying a storage position of first data of the plurality of types of data included in the target data by referring to the third information in accordance with a type of the first data, storing the first data in the specified storage position when second data of the plurality of types of data different from the first data is not stored in the specified storage position, and storing the first data in a position in at least one of the management area in which the third information corresponding to the type of the first data is stored and the specified storage position, based on comparison between the priority order of a type of the second data and the priority order of the type of the first data, when the second data is stored in the specified storage position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14A and FIG. 14B are diagrams for explaining an outline of the embodiment.

FIG. 25A and FIG. 25B are still another diagrams for explaining the outline of the embodiment.

DESCRIPTION OF EMBODIMENTS

Figure 1:
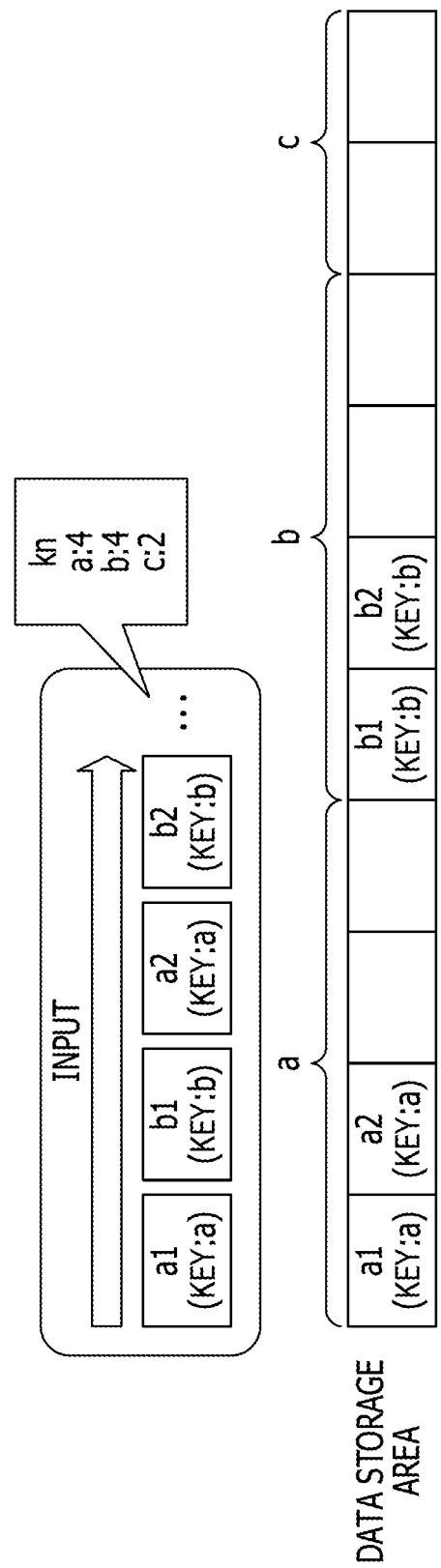
FIG. 1 is a diagram for explaining a process of storing a result acquired by sorting data to be input for each key in a data storage area.

In the following, input data values are sorted for each key and the sorted data values are stored in a data storage area. For example, as illustrated in FIG. 1, data values of a key "a" are stored in an area for "a" among the data storage areas in input order, data values of a key "b" are stored in an area for "b" among the data storage areas in input order, and data values of a key "c" are stored in an area for "c" among the data storage areas in input order. The order of a plurality of keys is predetermined: the key "a" is before the key "b" in the order (in other words, in FIG. 1, data value of key "a" is stored in left of data value of key "b"); and the key "b" is before the key "c" in the order (in other words, in FIG. 1, data value of key "b" is stored in left of data value of key "c"). In the embodiment, "key" of data value has the same meaning as "type" of data value.

By storing data values in this manner, it is possible to perform post-processing (for example, data mining, retrieval, and the like) at high speed.

Note that the following conditions are satisfied.

(1) Distribution of data values (the number of data values, hereinafter, referred to as kn) for each key is found in advance.

(2) The data values are input one by one.

(3) The data values are sorted and stored for each key in the data storage area.

(4) For each key, the data values are stored in accordance with input order.

In a case of an example of FIG. 1, the distribution of a is "4", the distribution of b is "4", and the distribution of c is "2". Therefore, by securing the data storage area capable of storing ten data values, it is possible to store the data values without excess or deficiency.

Figure 2:
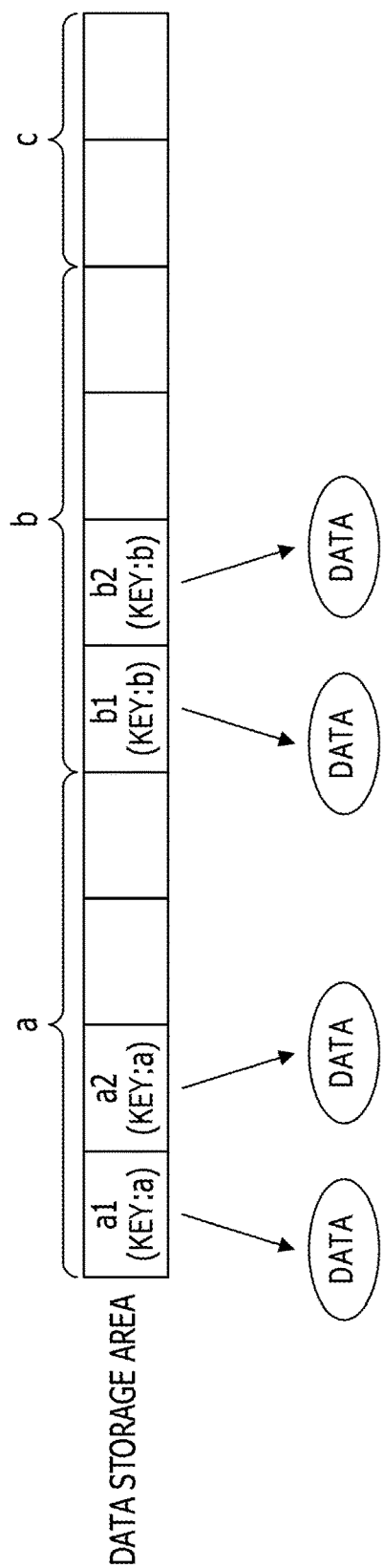
FIG. 2 is a diagram for explaining a case where a pointer is stored in the data storage area.

The data values may be directly stored in the data storage area, but as illustrated in FIG. 2, pointers for each data value may be stored. That is, the data values are stored in another storage area, and the data values may be accessed based on the pointers stored in the data storage area. In the following description, in order to simplify the explanation, unless other specified, the data values are stored in the data storage area.

Figure 3:
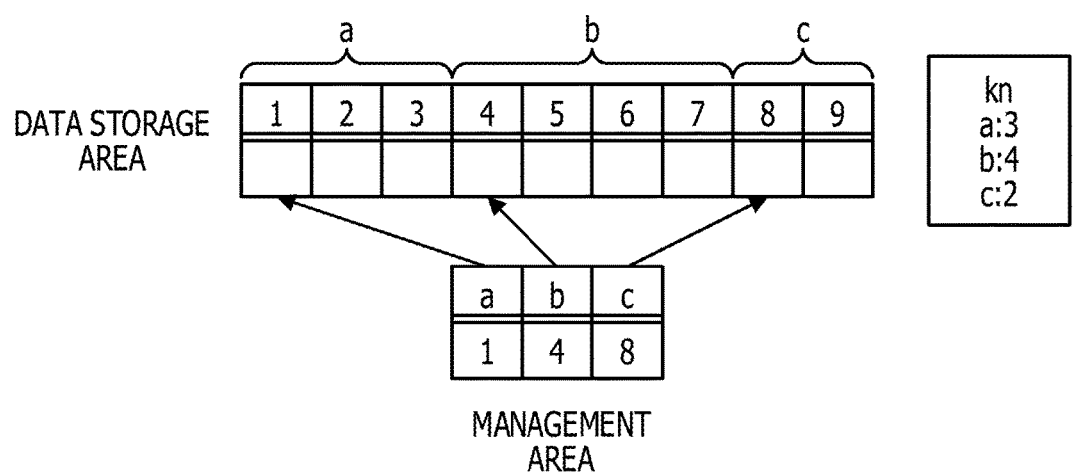
FIG. 3 is a diagram for explaining a first method where data is sorted and stored for each type.
Figure 4:
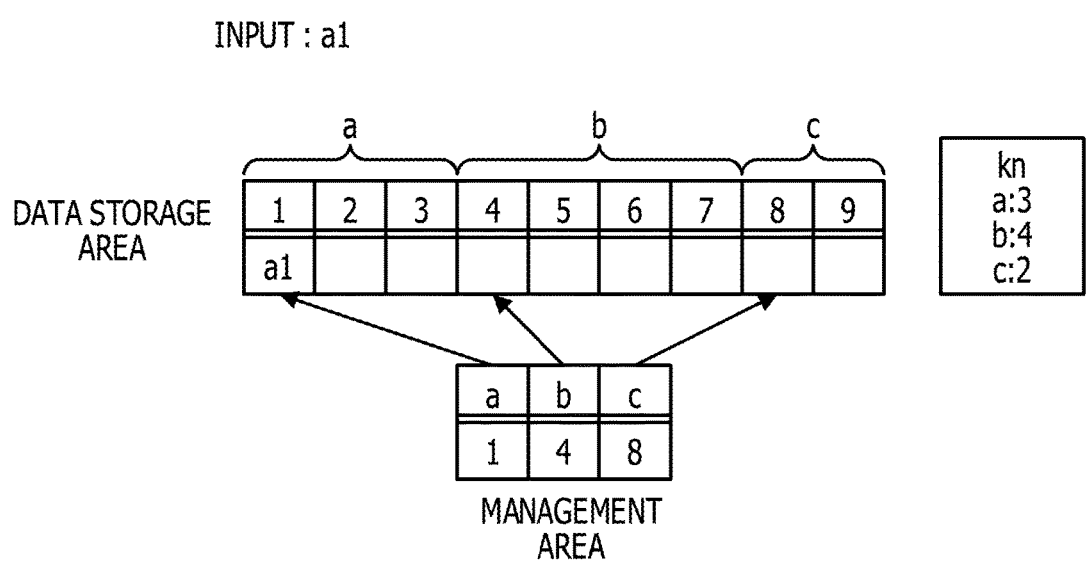
FIG. 4 is another diagram for explaining the first method where the data is sorted and stored for each type.
Figure 5:
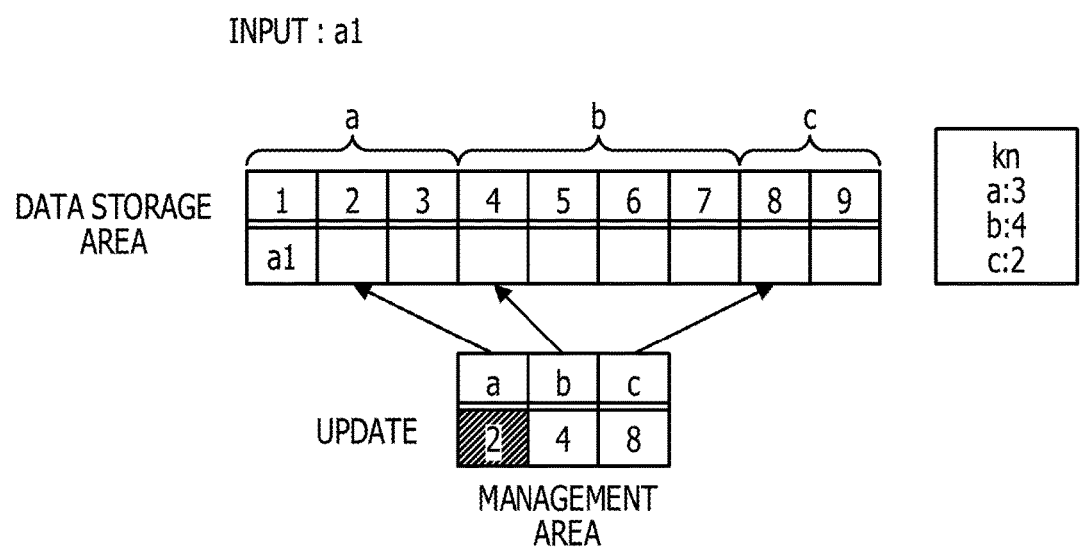
FIG. 5 is still another diagram for explaining the first method where the data is sorted and stored for each type.

By using FIG. 3 to FIG. 5, a first method for performing a storage process described by using FIG. 1 is described.

As illustrated in FIG. 3, in the first method, a management area, in which the pointers indicating positions where data values of keys are to be stored next is stored, is provided separately from the data storage area. In FIG. 3, the data value of the key "a" is stored in a storage position "1" (hereinafter, referred to as X[1]), the data value of the key "b" is stored in X[4], and the data value of the key "c" is stored in X[8]. An initial value of each pointer stored in the management area indicates a head position for each key. The number of pointers stored in the management area is the same as the number of keys.

As illustrated in FIG. 4, in a case where the data value "a1" is input, the data value "a1" is stored in X[1] indicated by the pointer for the key "a" stored in the management area.

Then, as illustrated in FIG. 5, the pointer for the key "a" stored in the management area is updated to indicate X[2].

According to the first method, it is possible to perform a process of sorting and storing the input data values for each key. However, since the size of the management area increases as the number of keys increases, the first method is not suitable for a case where the number of types of the data values is large.

Figure 6:
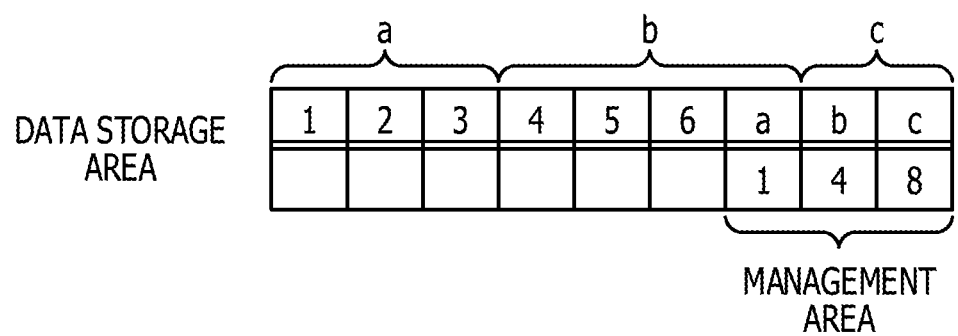
FIG. 6 is a diagram for explaining a second method where data is sorted and stored for each type.
Figure 7:
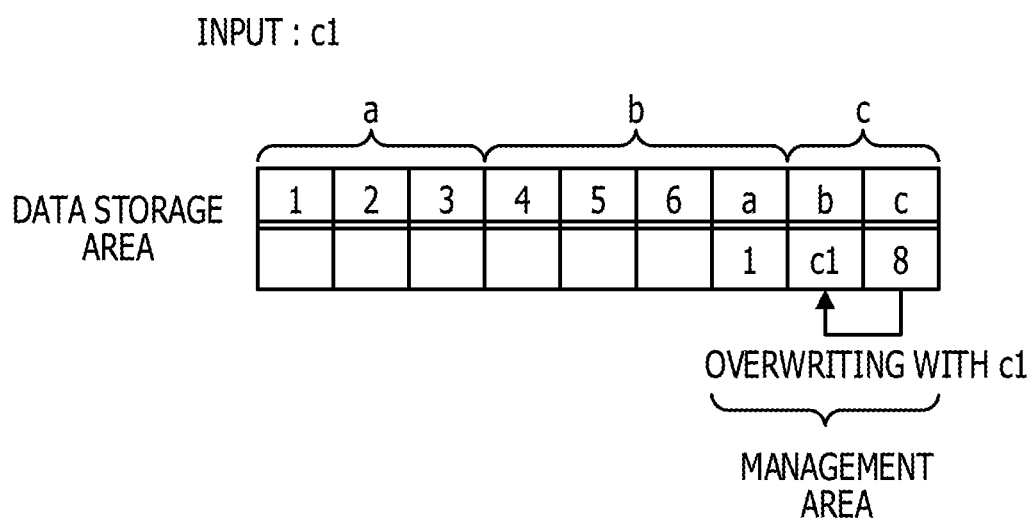
FIG. 7 is another diagram for explaining the second method where the data is sorted and stored for each type.

By using FIG. 6 and FIG. 7, a second method for performing the storage process described by using FIG. 1 is described.

As illustrated in FIG. 6, in the second method, the management area, in which the pointers indicating positions in which data values of keys are to be stored next is stored, is provided in the data storage area. In FIG. 6, the data value of the key "a" is stored in X[1], the data value of the key "b" is stored in X[4], and the data value of the key "c" is stored in X[8].

In the second method, the pointer to be used in a subsequent processing may be overwritten with the input data value. For example, as illustrated in FIG. 7, in a case where the data value "c1" is input in an initial state, the pointer for the key "b" stored in X[8] is overwritten with the data value "c1". Therefore, the data value of the key "b" may not be stored.

By using FIG. 8 to FIG. 12, a third method for performing the storage process described by using FIG. 1 is described.

Figure 8:
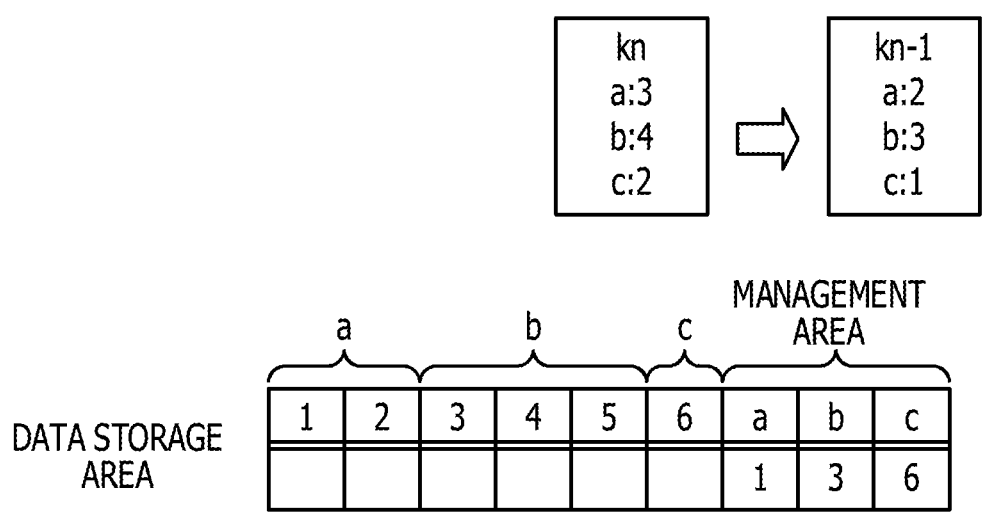
FIG. 8 is a diagram for explaining a third method where data is sorted and stored for each type.
Figure 9:
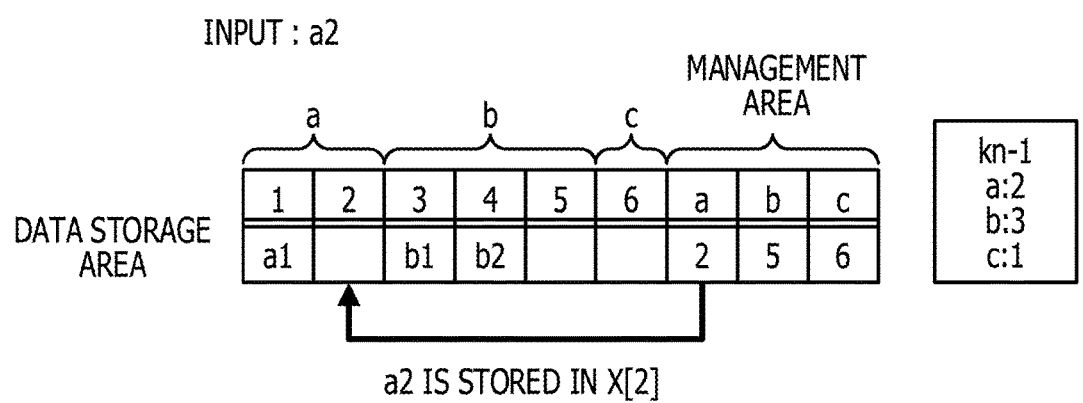
FIG. 9 is another diagram for explaining the third method where the data is sorted and stored for each type.

As illustrated in FIG. 8, in the third method, the management area in which the pointer indicating the position in which the data value of each key is stored next is stored is provided in the data storage area. In the third method, (kn−1) is acquired for each key, and the pointer indicating the head position of a case where (kn−1) data values are sorted and stored is stored in the management area. In FIG. 8, the data value of which the key is "a" is stored in X[1], the data value of which the key is "b" is stored in X[3], and the data value of which the key is "c" is stored in X[6].

The storage process proceeds basically in the same manner as that of the second method. For example, in a case where the data value "a2" is input in a state illustrated in FIG. 9, the data value "a2" is stored in X[2] in which the pointer for the key "a" stored in the management area is illustrated.

Figure 10:
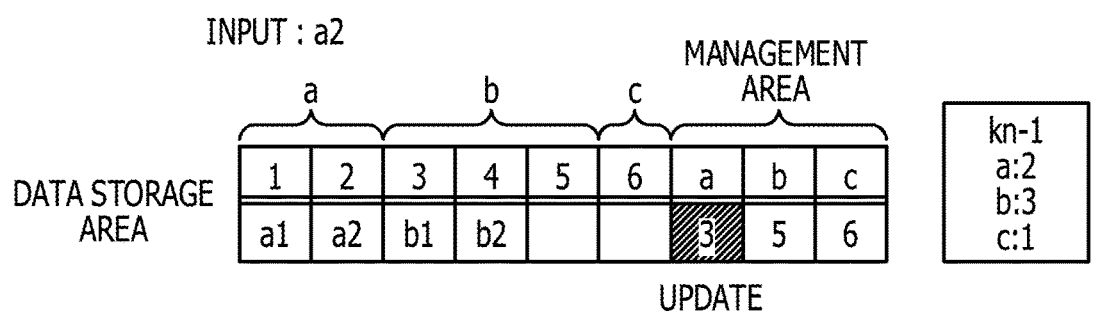
FIG. 10 is still another diagram for explaining the third method where the data is sorted and stored for each type.

Then, as illustrated in FIG. 10, the pointer for the key "a" stored in the management area is updated to indicate X[3].

Figure 11:
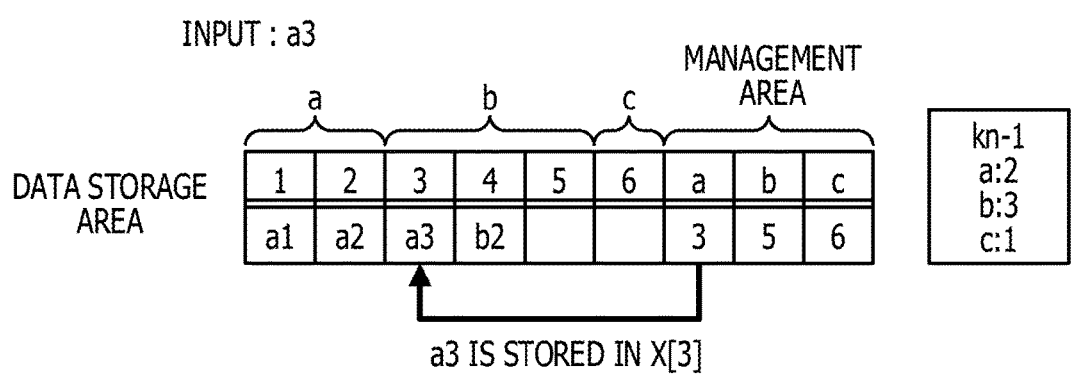
FIG. 11 is still another diagram for explaining the third method where the data is sorted and stored for each type.
Figure 12:
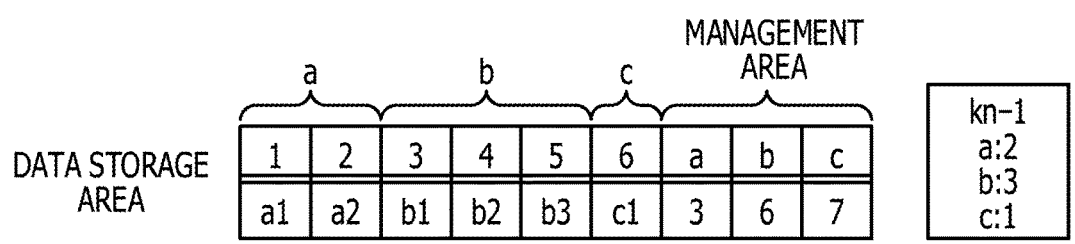
FIG. 12 is still another diagram for explaining the third method where the data is sorted and stored for each type.

Furthermore, as illustrated in FIG. 11, in a case where the data value "a3" is input, the data value "a3" is stored in X[3] indicated by the pointer for the key "a" stored in the management area.

However, by the third method, the last data value or the first data value of each key is overwritten, and it is hard to store the entire data value.

As described above, by the first to third methods, it is hard to appropriately store the data value. Accordingly, in the embodiment, the data value is stored by the following method.

Figure 13:
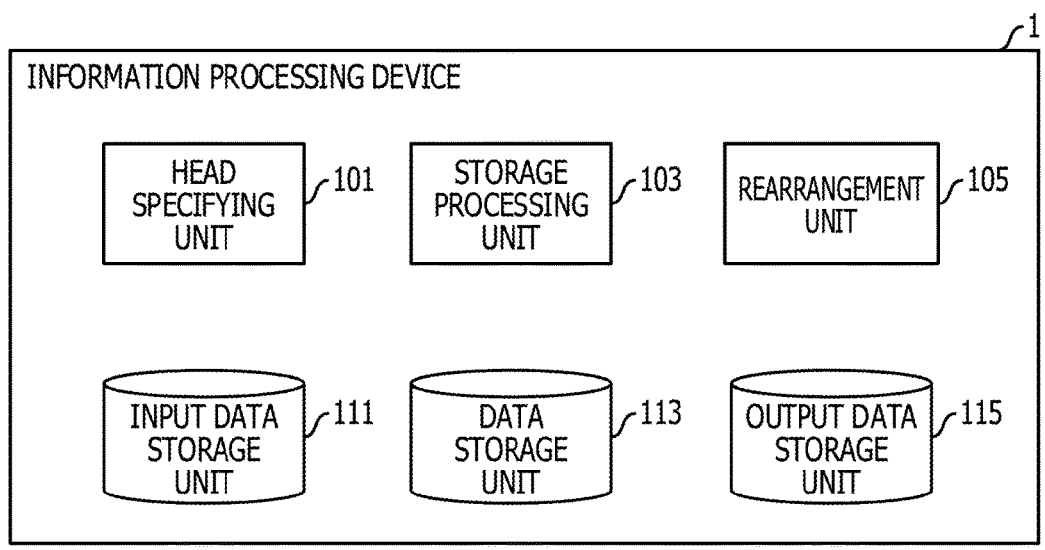
FIG. 13 is a functional block diagram of an information processing device.

In FIG. 13, a functional block diagram of an information processing device 1 of the embodiment is illustrated. The information processing device 1 includes a head specifying unit 101, a storage processing unit 103, a rearrangement unit 105, an input data storage unit 111, a data storage unit 113, and an output data storage unit 115. The head specifying unit 101, the storage processing unit 103, and the rearrangement unit 105 are realized by executing a program loaded in a memory 2501 illustrated in FIG. 30 by a central processing unit (CPU) 2503 illustrated in FIG. 30. The data storage unit 113 is provided in the memory 2501. The input data storage unit 111 and the output data storage unit 115 are provided in the memory 2501 or a hard disk drive (HDD) 2505 illustrated in FIG. 30.

The head specifying unit 101 performs a process for specifying the head position for each key based on data stored in the input data storage unit 111. The storage processing unit 103 stores input data stored in the input data storage unit 111 in the data storage unit 113 based on a result of the process by the head specifying unit 101. The data storage area including the management area is included in the data storage unit 113. The rearrangement unit 105 performs a process based on data stored in the data storage unit 113, and stores the processed result in the output data storage unit 115.

Next, by using FIG. 14A to FIG. 25B, an outline of the embodiment is described. Here, finally, the data value as illustrated in FIG. 14A is stored in the data storage area. That is, the data value "a1" is stored in X[1], the data value "a2" is stored in X[2], the data value "a3" is stored in X[3], the data value "b1" is stored in X[4], the data value "b2" is stored in X[5], the data value "b3" is stored in X[6], the data value "b4" is stored in X[7], the data value "c1" is stored in X[8], and the data value "c2" is stored in X[9]. Then the number of the data value of which the key is "a" is three, the number of the data value of which the key is "b" is four, and the number of the data value of which the key is "c" is two.

However, in the embodiment, similar to the third method, the pointer indicating the head position of a case where (kn−1) for each key is acquired and (kn−1) data values are sorted and stored is stored in the management area. Here, X[3] and X[6] are focused. In a case of performing the third method, as illustrated in FIG. 14B, one of the data value "a3" and the data value "b1" is stored in X[3] and one of the data value "b4" and the data value "c1" is stored in X[6].

Therefore, in a case where the data value is already stored in the storage position X[i] (1≤i≤9) indicated by the pointer, one of the input data value and the data value stored in X[i] is the last data value of a corresponding key (key "k") and the other data value is the first data value of a key in the position after the key "k" in the order. It is assumed that this property is property (1).

In addition, in a case where the last data value of a certain key is stored, an area storing the pointer for the key in the management area is not referred to the post-processing. It is assumed that this property is property (2).

In view of these property (1) and property (2), in the embodiment, in a case where the data value is already stored in the storage position indicated by the pointer X[i], the last data value among the data value and the data value to be input is specified. Then, the specified data value is stored in an area of the management area (that is, area not referred to in post-processing) storing the pointer for the key of the data value.

With this, it is possible to sort and store the data value for each key without using an additional area other than the data storage area and overwriting the data value.

Figure 15:
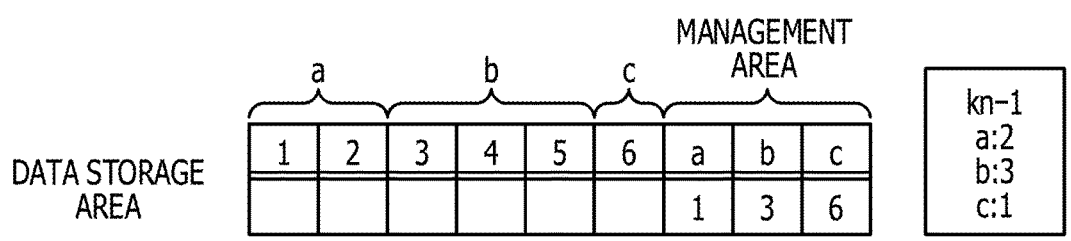
FIG. 15 is another diagram for explaining the outline of the embodiment.

By using FIG. 15 to FIG. 25B, a process in the embodiment is described more specifically. First, as illustrated in FIG. 15, the pointer for each key is stored in the management area within the data storage area. Specifically, based on (kn−1) of each key, the pointer indicating X[1] is stored for the key "a", the pointer indicating X[3] is stored for the key "b", and the pointer indicating X[6] is stored for the key "c".

Figure 16:
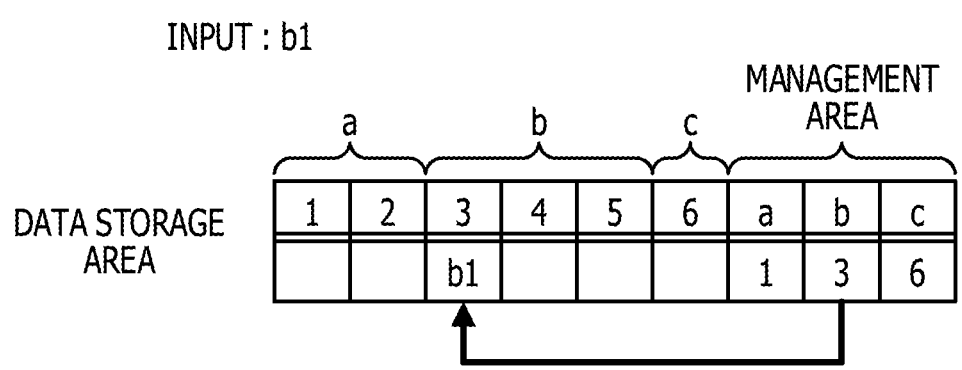
FIG. 16 is still another diagram for explaining the outline of the embodiment.
Figure 17:
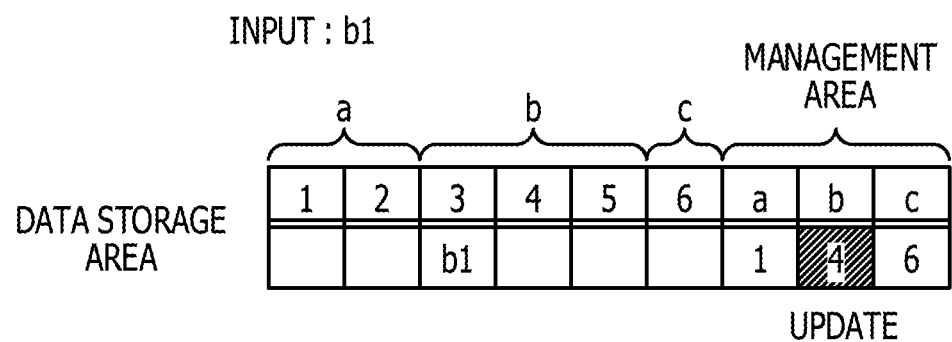
FIG. 17 is still another diagram for explaining the outline of the embodiment.

As illustrated in FIG. 16, in a case where the input data value is "b1", the data value "b1" is stored in X[3] indicated by the pointer for the key "b". Then, as illustrated in FIG. 17, the pointer for the key "b" is updated to indicate X[4].

Figure 18:
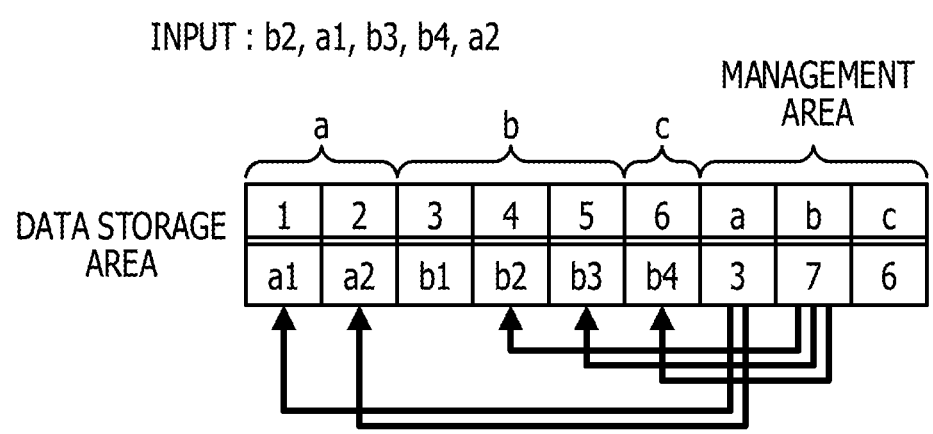
FIG. 18 is still another diagram for explaining the outline of the embodiment.

As illustrated in FIG. 18, it is assumed that the data value "b2", the data value "a1", the data value "b3", the data value "b4", and the data value "a2" are sequentially input. In this case, by storing each of the data values, the pointer for the key "a" is updated to indicate X[3], and the pointer for the key "b" is updated to indicate X[7]. The pointer for the key "c" is X[6].

Figure 19:
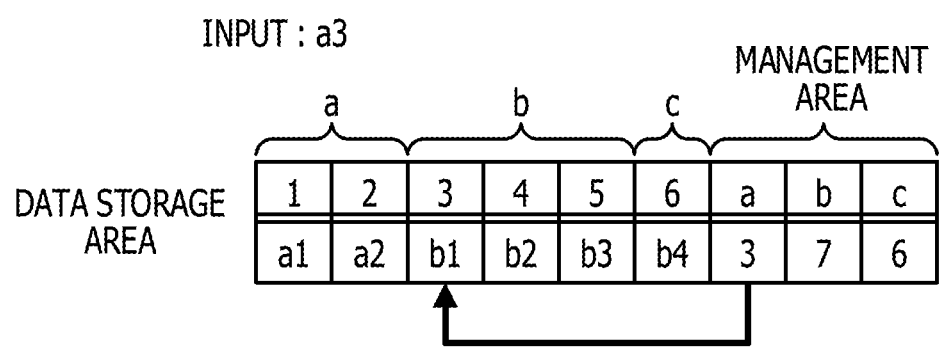
FIG. 19 is still another diagram for explaining the outline of the embodiment.
Figure 20:
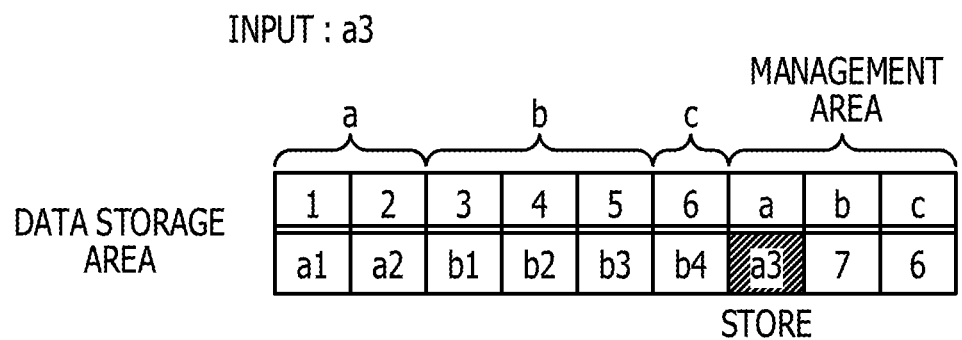
FIG. 20 is still another diagram for explaining the outline of the embodiment.

As illustrated in FIG. 19, in a case where the next input data value is "a3", the data value "b1" is stored already in X[3] indicated by the pointer for the key "a". In this case, as illustrated in FIG. 20, "a3" that is the last data value of the key "a" is stored in an area of the management area in which the pointer for the key "a" is stored.

Figure 21:
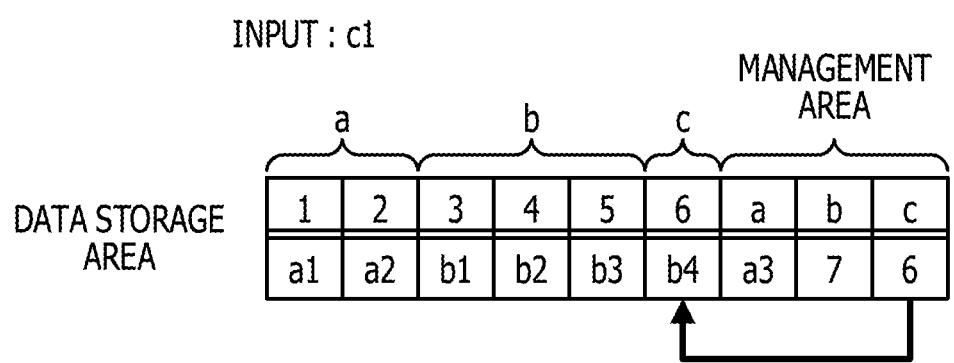
FIG. 21 is still another diagram for explaining the outline of the embodiment.
Figure 22:
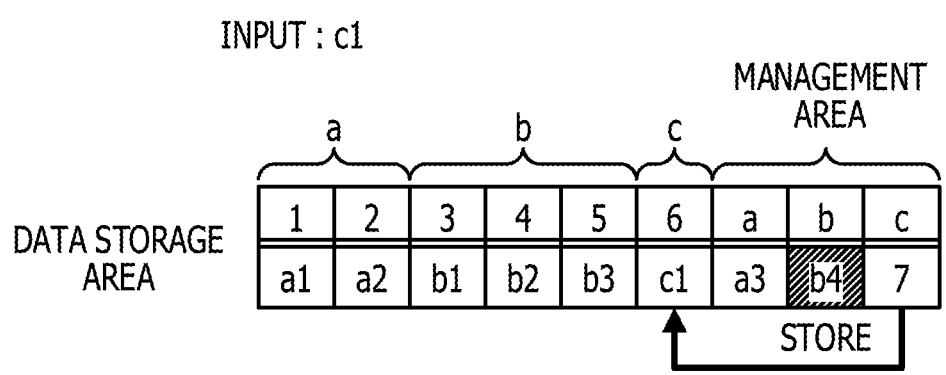
FIG. 22 is still another diagram for explaining the outline of the embodiment.

As illustrated in FIG. 21, in a case where the next input data value is "c1", the data value "b4" is stored already in X[6] indicated by the pointer for the key "c". In this case, as illustrated in FIG. 22, "b4" that is the last data value of the key "b" is moved to an area of the management area in which the pointer for the key "b" is stored. Then, the data value "c1" is stored in X[6] indicated by the pointer for the key "c", the pointer for the key "c" is updated to indicate X[7].

Figure 23:
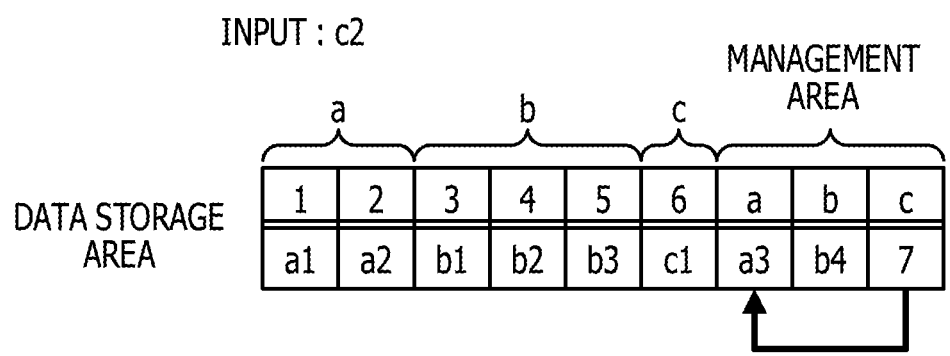
FIG. 23 is still another diagram for explaining the outline of the embodiment.
Figure 24:
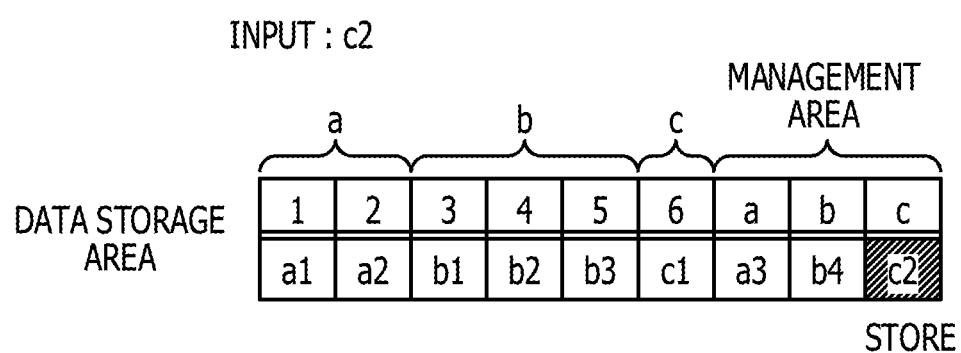
FIG. 24 is still another diagram for explaining the outline of the embodiment.

As illustrated in FIG. 23, in a case where the last input data value is "c2", the data value "a3" is stored already in X[7] indicated by the pointer for the key "c". Here, since "7" is greater than 6 that is the sum of (kn−1), as illustrated in FIG. 24, the data value "c2" is stored in an area of the management area in which the pointer for the key "c" is stored.

By processes so far, as illustrated in FIG. 25A, although the data value is stored, by rearranging the data values, as illustrated in FIG. 25B, it is possible to store the data value. The rearrangement may be performed in accordance with, for example, "stable merging" disclosed in Non-Patent Document 1. By the "stable merging", it is possible to rearrange the data values stored in an area other than the management area among the data storage areas and the data value stored in the management area while suppressing a use amount of the storage area. The stable merging means that "a1" is guaranteed to be stored on the left side of "a2" in a case where an array Y1. is on the left side of an array Y2 and "a1" and "a2" which are the data values of the same key are included in Y1 and Y2 respectively.

In the following description, a process performed by the information processing device 1 is described in more detail. As a premise, it is assumed that information of distribution (hereinafter, it is assumed that C[k] (k=1, 2, . . . , σ). σ is the number of keys and natural number of 2 or more) for each key is stored in the input data storage unit 111. In addition, in the following description, it is assumed that the pointer to the data value is stored in X[i] of the data storage area.

Figure 26:
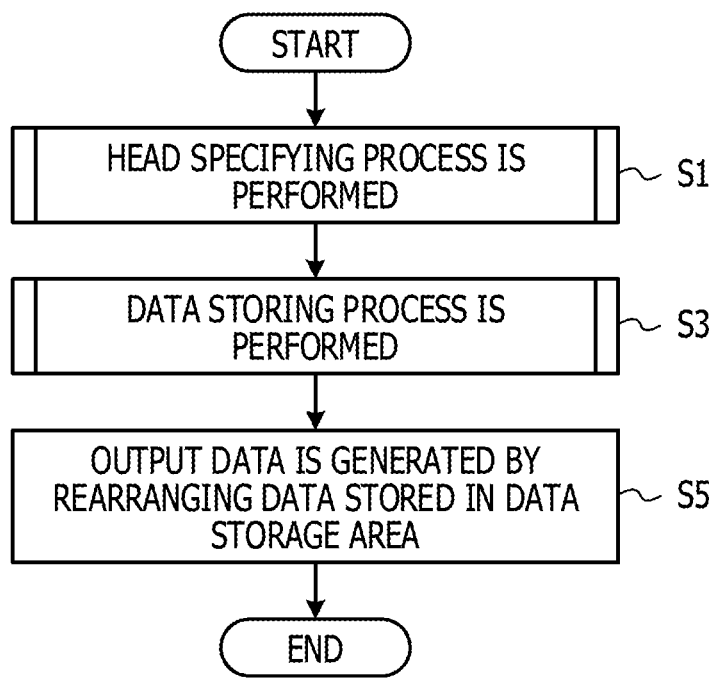
FIG. 26 is a diagram illustrating the main process flow.

First, the head specifying unit 101 performs a head specifying process (FIG. 26: step S1). The head specifying process is described by using FIG. 27 and FIG. 28B.

Figure 27:
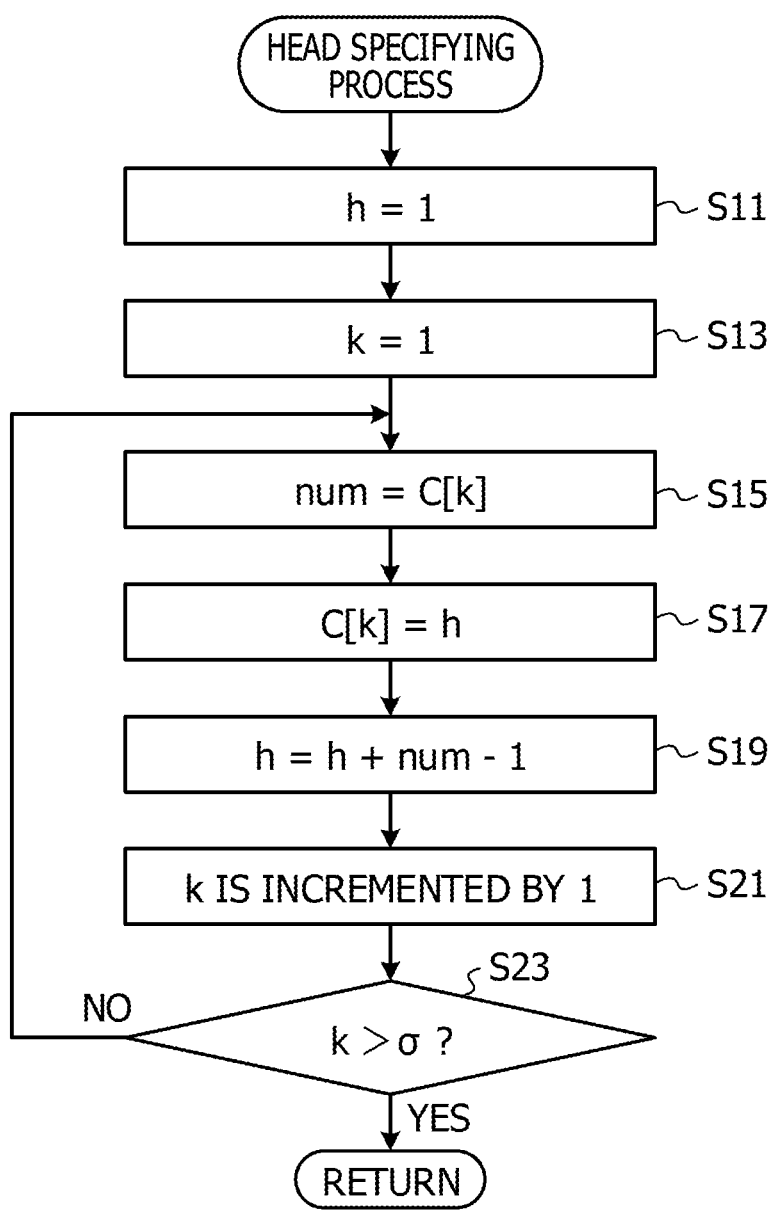
FIG. 27 is a diagram illustrating a process flow of a head specifying process.

The head specifying unit 101 sets 1 as a variable h representing the head (FIG. 27: step S11).

The head specifying unit 101 sets k, which is an identification number of key, at 1 (step S13). As described above, the order of the plurality of keys is predetermined in the embodiment. For example, in a case where the position of the key "a" in the order is before the position of the key "b" in the order, the identification number of the key "a" is smaller than the identification number of the key "b".

The head specifying unit 101 sets a value of C[k] to a variable num representing the distribution (step S15).

The head specifying unit 101 sets a value of h to C[k] (step S17). By this process, since C[k] becomes the pointer indicating the head position for the key of which the identification number is "k", the head specifying unit 101 stores the C[k] in the management area.

The head specifying unit 101 sets (h+num−1) to h (step S19). By this process, the h becomes the pointer indicating the head position for the next key.

The head specifying unit 101 increments the k by 1 (step S21).

The head specifying unit 101 determines whether k>σ is satisfied (step S23)

In a case where k>σ is not satisfied (step S23: No route), since the head specifying unit 101 processes the next k, the process returns to step S15. Meanwhile, in a case where k>σ is satisfied (step S23: Yes route), the process returns to the caller.

Figure 28A:
FIG. 28A and FIG. 28B are diagrams illustrating a pointer stored in the data storage area.

If the above process is performed, the pointer is set in the management area among the data storage areas, as illustrated in FIG. 28A. That is, the pointer indicating the head position is stored from the key of which the identification number is "1" to the key of which the identification number is σ.

Figure 29:
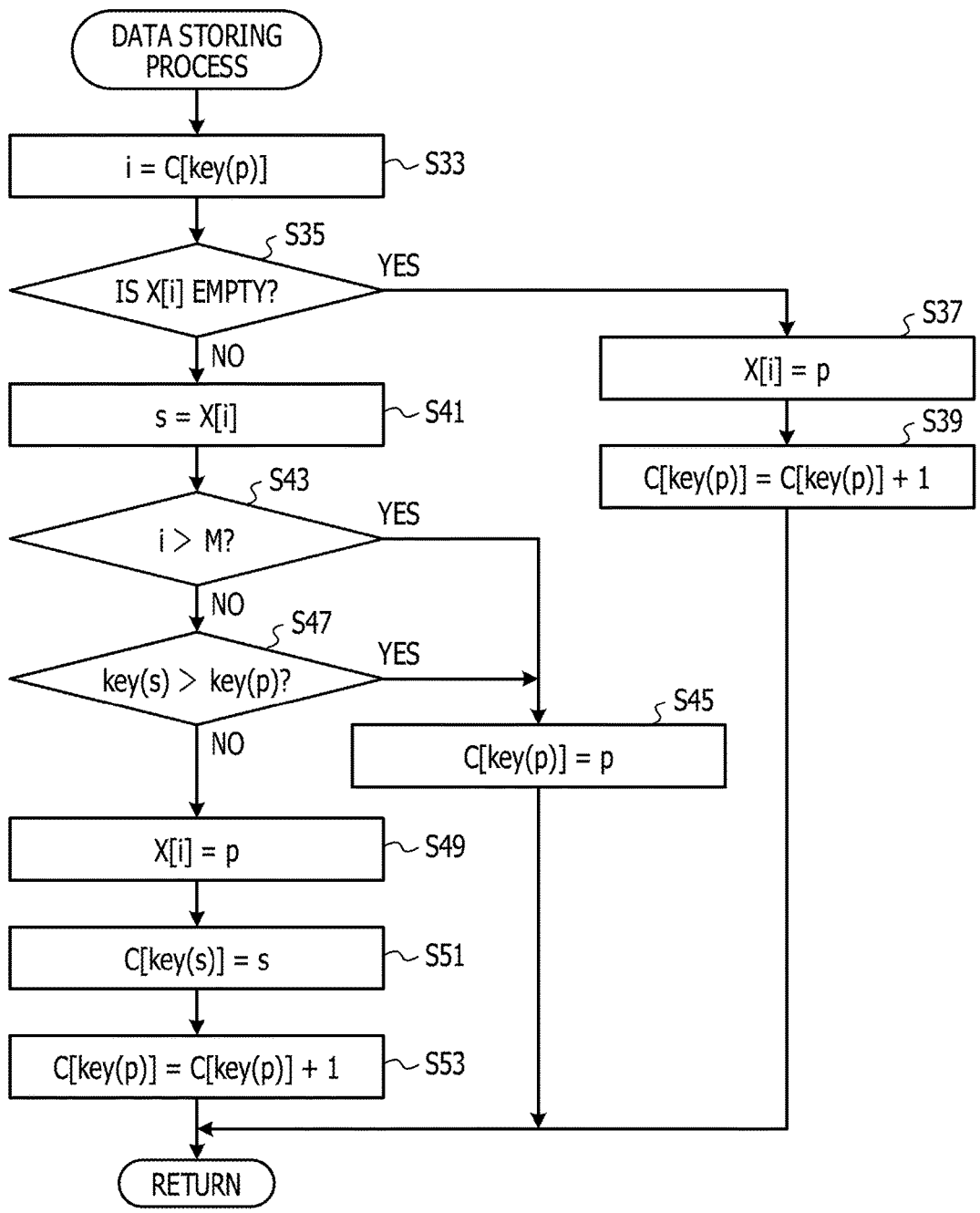
FIG. 29 is a diagram illustrating a process flow of a data storing process.

Returning to the description of FIG. 26, the storage processing unit 103 performs the data storing process (step S3). The data storing process is described by using FIG. 29. Here, it is assumed that the pointer to each of the data values is stored in the input data storage unit 111. This step is performed with respect to each pointer, but in order to simplify the explanation, a process for one pointer p is described.

The storage processing unit 103 reads one pointer p to the data value from the input data storage unit 111. Then, the storage processing unit 103 sets C[key (p)] to a variable i that is the identification number indicating the storage position (step S33). The key (p) is the identification number of key of the data value represented by the pointer p.

The storage processing unit 103 determines whether X[i] is empty (that is, value is not set to X[i]) (step S35).

In a case where X[i] is empty (step S35: Yes route), the pointer to another data value is not stored in an area of X[i]. Therefore, the storage processing unit 103 sets p in X[i] (step S37).

The storage processing unit 103 sets C[key (p)]+1 in C[key (p)] (step S39). That is, the storage processing unit 103 updates the pointer for key (p) to indicate an adjacent area.

Meanwhile, in a case where X[i] is not empty (step S35: Yes route), the pointer to another data value is stored in an area of X[i]. Therefore, the storage processing unit 103 sets X[i] in a variable s indicating the pointer to another data value (step S41).

The storage processing unit 103 determines whether i>M is satisfied (step S43). The M is the sum (for example, 6 in a case of examples of FIG. 15 to FIG. 25B) of (kn−1).

In a case where i>M is satisfied (step S43: Yes route), the pointer p is the last read pointer. Therefore, the storage processing unit 103 sets the pointer p in C[key (p)] (step S45).

Meanwhile, in a case where i>M is not satisfied (step S43: No route), the pointer p is not the last read pointer. Therefore, the storage processing unit 103 determines whether key (s)>key (p) is satisfied (step S47). That is, the storage processing unit 103 determines whether the position of key (s) in the order is after the position of key (p) in the order.

In a case where key (s)>key (p) is satisfied (step S47: Yes route), the position of key (s) in the order is after the position of key (p) in the order. Therefore, the process proceeds to step S45.

In a case where key (s)>key (p) is not satisfied (step S47: No route), the position of key (s) in the order is before the position of key (p) in the order. Therefore, the storage processing unit 103 sets p in X[i] (step S49).

The storage processing unit 103 sets the pointer s in C[key (s)] (step S51).

The storage processing unit 103 sets C[key (p)]+1 in C[key (p)] (step S53). That is, the storage processing unit 103 updates the pointer for key (p) to indicate an adjacent area. Then, the process returns to the caller.

Figure 28B:

If the above process is performed, the pointer as illustrated in FIG. 28B is set in the data storage area. That is, n pointers are stored in the data storage area. The n is the total number of the data values.

Returning to the description of FIG. 26, the rearrangement unit 105 generates output data by rearranging the pointer stored in the data storage area (step S5), and stores the output data in the output data storage unit 115. As described above, in step S5, for example, the rearrangement is performed by the "stable merging". Then, the process is completed.

If the above process is performed, it is possible to perform a process for sorting the plurality of types of data based on the types thereof and storing the sorted result while suppressing the use amount of the data storage area. With this, it is possible to suppress deterioration of other processes due to performance of a sorting process or the like.

As described above, the embodiment is described. However, the embodiments discussed herein is not limited thereto. For example, a functional block configuration of the information processing device 1 described above may not match an actual program module configuration in some cases.

In addition, the above-described data configuration is an example, and it does not have to be configured as described above. Furthermore, also in a process flow, if the processing result does not change, it is also possible to change the order of the processing. Furthermore, it may be made to perform in parallel.

In the example described above, the pointer p to each data value is read from the input data, but the storage processing unit 103 may sequentially accept the input of the pointer p from the user or the like, or the information processing device 1 may sequentially receive the pointer p from another device.

Figure 30:
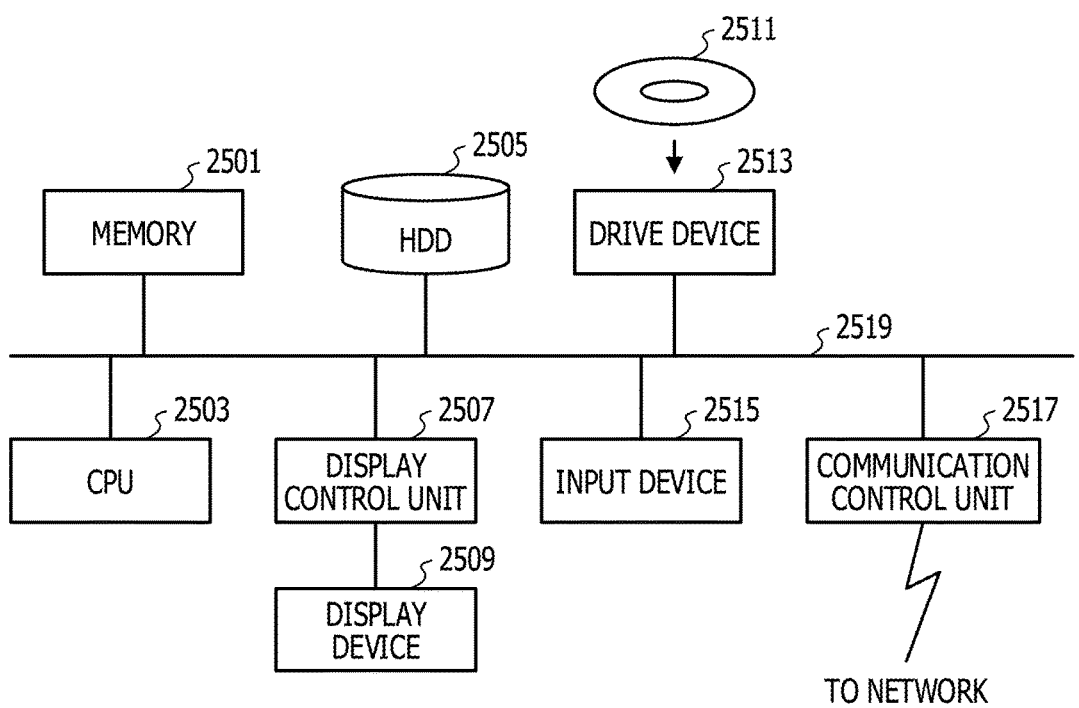
FIG. 30 is a functional block diagram of a computer.

The information processing device 1 is described below is a computer device. As illustrated in FIG. 30, the memory 2501, the CPU 2503, the HDD 2505, a display control unit 2507 coupled to a display device 2509, a drive device 2513 for a removable disk 2511, an input device 2515, and a communication control unit 2517 for coupling to a network are coupled with each other through a bus 2519. An operating system (OS) and an application program for performing the process in the embodiment are stored in the HDD 2505, and are read out from the HDD 2505 to the memory 2501 when executed by the CPU 2503. The CPU 2503 controls the display control unit 2507, the communication control unit 2517, and the drive device 2513 according to the contents of the application program, and causes a predetermined operation of them. In addition, data during the processing is mainly stored in the memory 2501, and may be stored in the HDD 2505. In the embodiment discussed herein, the application program for performing the above-described processes is stored and distributed in the computer readable removable disk 2511, and installed from the drive device 2513 to the HDD 2505. There is a case where the application program may be installed in the HDD 2505 via a network such as the Internet and the communication control unit 2517. Such a computer device realizes various functions by organically cooperating hardware such as the CPU 2503 and the memory 2501, the OS, and a program such as the application program, which are described above.

The above-described embodiment is summarized as follows.

A storage method according to a first aspect of the embodiment includes a process of (A) storing information of a storage position in the management area within the data storage area for each of the plurality of types in accordance with a number that each piece of the plurality of types of data has for each type and the order of the plurality of types in target data including the plurality of types of data, (B) specifying the storage position of the input data from the management area based on the type of the input data according to input of data included in the target data, (C) storing the input data in the specified storage position in a case where other data is not stored in the specified storage position, and (D) storing the input data in a position in which the information of the storage position corresponding to the type of the input data in the management area is stored or in the specified storage position based on comparison of the position of the type of other data in the order and the position of the type of the input data in the order in a case where other data is stored in the specified storage position.

It is possible to perform a process sorted and stored based on the type of the plurality of types of data that are sequentially input while suppressing the use amount of the data storage area.

In addition, in a process of storing the input data when other data is stored in the specified storage position, (d1) the input data may be stored in the specified storage position in a case where other data is stored in the specified storage position and the position of the type of other data in the order is before the position of the type of the input data in the order, and (d2) the input data may be stored in a position of the management area in which the information of the storage position corresponding to the type of the input data is stored when other data is stored in the specified storage position and the position of the type of other data in the order is after the position of the type of the input data in the order.

In addition, the storage method may further include (E) a process of updating the information of the storage position corresponding to the type of the input data stored in the management area.

In this manner, it is possible to store data to be input in the next time in an appropriate position.

In addition, this storage method may further include (F) a process of storing other data in a position of the management area in which the information of the storage position corresponding to the type of other data is stored in a case where other data is stored in the specified storage position and the position of the type of other data in the order is before the position of the type of the input data in the order.

In this manner, no other data originally stored in the specified storage position is deleted by rewriting.

In addition, this storage method may further include (G) a process for rearranging data stored in the management area and data stored in an area other than the management area among the data storage areas in a case where input of data included in the target data is completed, in an input order for each type.

Even in a case where a state after storing is not an appropriate state, it is possible to correct an appropriate state.

In addition, the number of the storage positions included in the data storage area may be equal to the sum of the number of pieces of data for each of the plurality of types.

In this manner, it is possible to minimize an area to be used.

A storage apparatus according to a second aspect of the embodiment includes (H) a first processing unit (for example, head specifying unit 101) that stores the information of a storage position in the management area within the data storage area for each of the plurality of types in accordance with a number that each piece of the plurality of types of data has for each type and the order of the plurality of types in the target data including the plurality of types of data, and (I) a second processing unit (for example, storage processing unit 103) that specifies the storage position of the input data from the management area based on the type of the input data according to the input of the data included in the target data, stores the input data in the specified storage position in a case where data is not stored in the specified storage position, and stores the input data in a position in which the information of the storage position corresponding to the type of the input data is stored in the management area or in the specified storage position based on comparison between the position of the type of other data in the order and the position of the type of the input data in the order in a case where other data is stored in the specified storage position.

A program for causing a processor to perform the processes according to the above method may be created and the program may be stored in a computer-readable storage medium or a storage device such as a flexible disk, a CD-ROM, a magneto-optical disk, a semiconductor memory, and a hard disk. The intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of storing target data into a data storage area by a computer, the target data including a plurality of types of data, the method comprising:

acquiring first information indicating a number of data piece of each of the plurality of types of data included in the target data, and second information indicating an priority order of the plurality of types of data in the target data;

storing, in a management area within the data storage area, third information indicating an area defined based on the first information and the second information within the data storage area, each data piece of the plurality of types of data being to be stored in the area indicated by the third information;

specifying a storage position of first data of the plurality of types of data included in the target data by referring to the third information in accordance with a type of the first data;

storing the first data in the specified storage position when second data of the plurality of types of data different from the first data is not stored in the specified storage position; and storing the first data in a position in at least one of the management area in which the third information corresponding to the type of the first data is stored and the specified storage position, based on comparison between the priority order of a type of the second data and the priority order of the type of the first data, when the second data is stored in the specified storage position.

2. The method according to claim 1,
wherein, in the storing of the first data when the second data is stored in the specified storage position, the first data is stored in the specified storage position when the priority order of the type of the second data is prior to the priority order of the type of the first data, and the first data is stored in the position in the management area in which the third information corresponding to the type of the first data is stored when the priority order of the type of the first data is prior to the priority order of the type of the second data.

3. The method according to claim 1, further comprising:
updating the third information corresponding to the type of the first data stored in the management area.

4. The method according to claim 2, further comprising:
storing the second data in a position in which the third information corresponding to the type of the second data is stored in the management area when the second data is stored in the specified storage position and the priority order of the type of the second data is prior to the priority order of the type of the first data.

5. The method according to claim 1, further comprising:
when the storing of the target data is completed, rearranging the target data stored in the management area and an area of the data storage area other than the management area for each type of the target data and in the priority order.

6. The method according to claim 1,
wherein a number of storage positions included in the data storage area is equal to the sum of pieces of the plurality of types of data included in the target data.

7. An information processing apparatus configured to store target data into a data storage area, the target data including a plurality of types of data, the information processing apparatus comprising:
a memory; and
a processor coupled to the memory and configured to:
acquire first information indicating a number of data piece of each of the plurality of types of data included in the target data, and second information indicating an priority order of the plurality of types of data in the target data,
store, in a management area within the data storage area, third information indicating an area defined based on the first information and the second information within the data storage area, each piece of the plurality of types of data being to be stored in the area indicated by the third information,
specify a storage position of first data of the plurality of types of data included in the target data by referring to the third information in accordance with a type of the first data,
store the first data in the specified storage position when second data of the plurality of types of data different from the first data is not stored in the specified storage position, and
store the first data in a position in at least one of the management area in which the third information corresponding to the type of the first data is stored and the specified storage position, based on comparison between the priority order of a type of the second data and the priority order of the type of the first data, when the second data is stored in the specified storage position.

8. The information processing apparatus according to claim 7,
wherein, in storing of the first data when the second data is stored in the specified storage position, the first data is stored in the specified storage position when the priority order of the type of the second data is prior to the priority order of the type of the first data, and the first data is stored in the position in the management area in which the third information corresponding to the type of the first data is stored when the priority order of the type of the first data is prior to the priority order of the type of the second data.

9. The information processing apparatus according to claim 7, wherein the processor is configured to:
update the third information corresponding to the type of the first data stored in the management area.

10. The information processing apparatus according to claim 7, wherein the processor is configured to:
store the second data in a position in which the third information corresponding to the type of the second data is stored in the management area when the second data is stored in the specified storage position and the priority order of the type of the second data is prior to the priority order of the type of the first data.

11. The information processing apparatus according to claim 7, wherein the processor is configured to:
when storing of the target data is completed, rearrange the target data stored in the management area and an area of the data storage area other than the management area for each type of the target data and in the priority order.

12. The information processing apparatus according to claim 7,
wherein a number of storage positions included in the data storage area is equal to the sum of pieces of the plurality of types of data included in the target data.

13. A non-transitory computer-readable storage medium storing a program that causes an information processing apparatus to execute a process, the process comprising:
acquiring first information indicating a number of data piece of each of the plurality of types of data included in the target data, and second information indicating an priority order of the plurality of types of data in the target data;
storing, in a management area within the data storage area, third information indicating an area defined based on the first information and the second information within the data storage area, each piece of the plurality of types of data being to be stored in the area indicated by the third information;
specifying a storage position of first data of the plurality of types of data included in the target data by referring to the third information in accordance with a type of the first data;
storing the first data in the specified storage position when second data of the plurality of types of data different from the first data is not stored in the specified storage position; and
storing the first data in a position in at least one of the management area in which the third information corresponding to the type of the first data is stored and the specified storage position, based on comparison between the priority order of a type of the second data and the priority order of the type of the first data, when the second data is stored in the specified storage position.

14. The non-transitory computer-readable storage medium according to claim 13, wherein, in the storing of the first data when the second data is stored in the specified storage position, the first data is stored in the specified storage position when the priority order of the type of the second data is prior to the priority order of the type of the first data, and the first data is stored in the position in the management area in which the third information corresponding to the type of the first data is stored when the priority order of the type of the first data is prior to the priority order of the type of the second data.

15. The non-transitory computer-readable storage medium according to claim 13, the process further comprising:

updating the third information corresponding to the type of the first data stored in the management area.

16. The non-transitory computer-readable storage medium according to claim 14, the process further comprising:

storing the second data in a position in which the third information corresponding to the type of the second data is stored in the management area when the second data is stored in the specified storage position and the priority order of the type of the second data is prior to the priority order of the type of the first data.

17. The non-transitory computer-readable storage medium according to claim 13, the process further comprising:

when the storing of the target data is completed, rearranging the target data stored in the management area and an area of the data storage area other than the management area for each type of the target data and in the priority order.

18. The non-transitory computer-readable storage medium according to claim 13, wherein a number of storage positions included in the data storage area is equal to the sum of pieces of the plurality of types of data included in the target data.

* * * * *